J. D. BELL.

COMBINED BED AND SEAT.

APPLICATION FILED DEC. 28, 1915

Reissued Nov. 12, 1918.

14,549.

INVENTOR

Joseph D. Bell,

By Francis M. Wright,

ATTORNEY.

UNITED STATES PATENT OFFICE.

JOSEPH D. BELL, OF SAN FRANCISCO, CALIFORNIA, ASSIGNOR TO JOSEPH D. BELL COMPANY, A CORPORATION OF CALIFORNIA.

COMBINED BED AND SEAT.

14,549. Specification of Reissued Letters Patent. Reissued Nov. 12, 1918.

Original No. 1,166,315, dated December 28, 1915, Serial No. 49,190, filed September 7, 1915. Application for reissue filed December 28, 1915. Serial No. 69,131.

*To all whom it may concern:*

Be it known that I, JOSEPH D. BELL, a citizen of the United States, and residing at San Francisco, in the county of San Francisco and State of California, have invented certain new and useful Improvements in Combined Beds and Seats, of which the following is a specification.

The object of the present invention is to provide a combined bed and seat, which is very simple in construction and convenient in operation.

Figure 1:
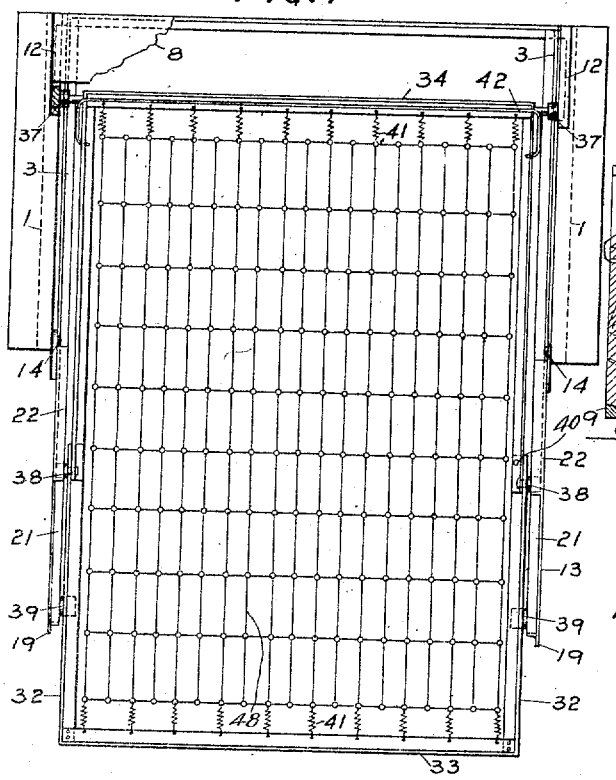
Figure 3:
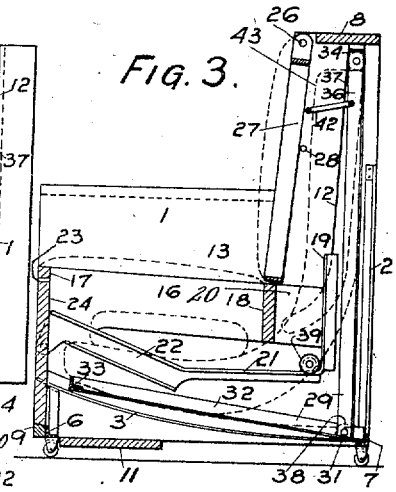
Figure 4:
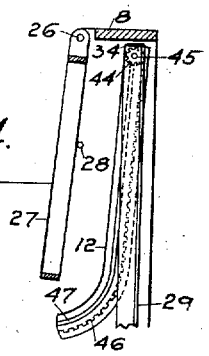
Figure 5:
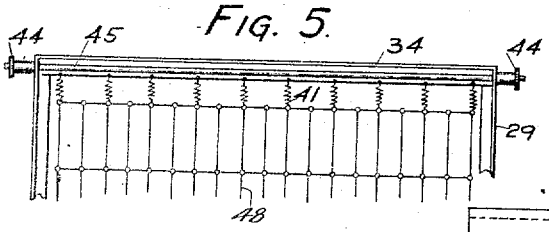
Figure 2:
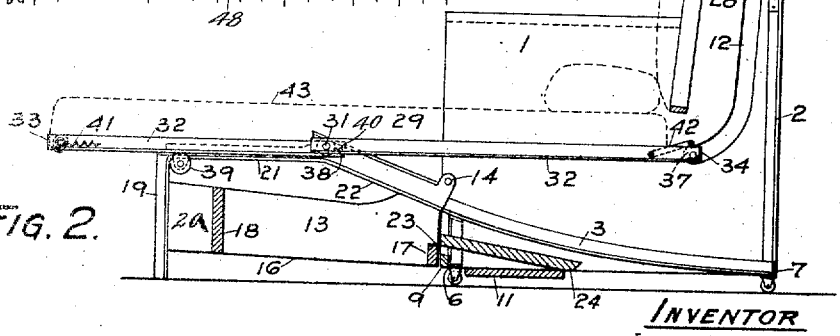

In the accompanying drawing, Figure 1 is a broken plan view of the apparatus when used as a bed; Fig. 2 is a longitudinal vertical section of the same, the wire mattress being omitted; Fig. 3 is a similar view of the same, when used as a chair or davenport; Fig. 4 is a partial similar view of a modified form of the invention; Fig. 5 is a partial broken view, similar to Fig. 1, showing said modification.

On referring to the drawing, it will be seen that the frame or housing of my improved bed and seat comprises side pieces 1 stiffened by angle-irons or guideways 3, and connected by cross angle-irons 6, 7, a rear upper cross piece 8 and front lower cross pieces 9 and 11. In the inner surfaces of said side pieces are grooves 12.

A seat frame 13 is pivoted to the main frame by pivots 14 and comprises side pieces 16, connected by a front cross piece 17 and a rear cross piece 18, and has extensions 20, to each extension and to each side of said seat frame is secured a metallic piece comprising a vertical angle-iron 19, a horizontal angle-iron 21 and an oblique channel-iron or guideway 22, said channel irons being the parts of the seat frame through which the pivots pass. To said seat frame is pivoted, as shown at 23, a front piece 24, the free end of which, when the device is used as a bed, rests upon the cross piece 11, and, when the device is used as a chair or davenport, fills the opening between the cross pieces 17 and 9. To the main frame is also pivoted, as shown at 26, a back frame 27, which can swing forwardly from a position in which it rests against a stop 28.

A mattress frame 29 is composed of two parts pivoted together, as shown at 31, each part comprising an angle-iron 32 on each side, said angle-irons being connected transversely at the end of the mattress frame by angle-irons 33, 34 respectively. The rear part 36 is carried on each side by two rollers 37, 38, of which the rear roller 37 can roll in the groove 12 in the corresponding piece 2, and the front roller 38 can roll in the channel-iron 22. This channel-iron, in the open position, or that shown in Fig. 2, registers with, or is a continuation of, the angle-iron 3, so that the front roller 38 first rolls in said channel-iron and then on said angle-iron. The front angle-irons 32 travel upon stationary rollers 39 rotatably carried by the horizontal members 21. The front ends of said front angle-irons can run on rollers 35 and their rear ends extend beneath the front ends of the rear angle-irons a sufficient distance to sustain the front ends of the front angle-irons when a weight is superimposed thereon. To lock the parts of the frame rigidly together when in its extended position, pins 40 extending upwardly from the front angle-irons pass through holes in the rear angle-irons. The mattress springs 41, which are attached to the ends of the wire fabric or webbing 48, are connected to the horizontal members of said transverse angle-irons 33, 34, and since these horizontal members are below the pivotal connections of said angle-irons, the tension of the spring tends to draw the front ends of the front angle-iron downward, and therefore to maintain the wire mattress taut.

42 indicates a loop, the ends of which are attached to the wire mattress frame to hold the stuffed mattress 43, shown in dotted lines, in position.

The manner of conversion of the apparatus from a chair or davenport to a bed, and conversely, is very simple. To move the device from the position shown in Fig. 3 to the position shown in Fig. 2, the back frame is first swung forwardly and upwardly, then the seat frame is swung forwardly and outwardly into the position shown in Fig. 2, and then the mattress frame is drawn forward into the position shown in said figure. The reverse operation takes place on closing the bed. It will be observed that ample space is provided for containing the mattress in the closed position of the bed and also the pillows and other bedding. In the latter position, the rear portion of the mattress and mattress frame are located between the two extensions 20, which, in the extended position of the apparatus, extend forwardly of the seat frame, and, being secured to the vertical angle irons or legs 19, provide a support for the bed extending much more forwardly than would be obtained were they not provided.

In the modification of the invention illustrated in Figs. 4 and 5, the mattress frame is carried at the rear end upon a shaft 45, the ends of which travel in grooves 47 in said side pieces 1, on the ends of which shaft 45 are pinions 44, which mesh with racks 46 in the grooves 12. This construction insures both sides of the mattress frame traveling at the same speed and renders it unnecessary to apply pressure at the middle of the mattress frame in pushing it back into the closed position.

I claim:—

1. A combined bed and seat having a forwardly swinging seat frame, and a mattress frame, the front portion of which is arranged to move forwardly on the seat frame when the latter is in its forward position, and means for guiding the rear portion of said mattress frame upwardly behind the back of the seat.

2. A combined bed and seat comprising a forwardly swinging seat frame having guides extending in the forward position of the seat frame rearwardly and downwardly, a main frame having guides registering with the first-named guides and extending rearwardly and downwardly and also having upwardly extending guides, and a mattress frame having parts movable respectively in the rearwardly and downwardly extending guides and in the upwardly extending guides.

3. A combined bed and seat comprising a forwardly swinging seat frame having guides extending in the forward position of the seat frame rearwardly and downwardly, a main frame having guides registering with the first-named guides and extending rearwardly and downwardly and also having upwardly extending guides, and a mattress frame having parts movable respectively in the rearwardly and downwardly extending guides and in the upwardly extending guides, the front portion of the mattress frame being supported by the seat frame in the forward position of the latter.

4. A combined bed and seat having a swinging seat frame provided with a track, a main frame having a track registering with the first-named track, and a mattress frame guided by said tracks.

5. A combined bed and seat comprising a reversible seat portion, and a mattress frame, a track for the mattress frame secured to the reversible seat portion, and a stationary track beneath the seat portion, said tracks having adjacent ends to form a substantially continuous track.

6. A combined bed and seat comprising a mattress frame having two sections hinged together, one section having extensions past the hinges, said extension and the other section having, the one pins and the other holes to receive said pins.

7. A combined bed and seat comprising a main frame, a seat frame movably connected thereto, and a mattress frame movable on and guided by said frames and disengaged from said seat frame in the collapsed position of the latter.

8. A combined bed and seat having a reversible seat portion, a movable mattress frame disconnected from said seat portion, and means secured below, and movable with the reversible seat portion for guiding the mattress frame therealong.

9. A combined bed and seat having a reversible seat portion, a movable mattress frame, and a horizontal track for the mattress frame secured below, and movable with the reversible seat portion and engaged by said mattress frame only when the latter moves therealong.

10. A combined bed and seat having a rigid main frame, a forwardly movable rigid frame guided thereby and having fixed thereon tracks located to support and guide both sides of a mattress frame, and a movable mattress frame supported and guided by said frames and tracks, said movable frame being movable independently of the mattress frame.

11. A combined bed and seat having a rigid main frame, a reversible frame pivoted thereto, and a movable mattress frame supported and guided by said frames, said reversible frame being movable independently of the mattress frame.

12. A combined bed and seat having a housing, a pair of guideways therein, a second pair of guideways pivotally connected to said housing to swing about horizontal axes, and adapted to be moved into alinement with the first-named guideways respectively, a movable mattress frame and parts connected to said mattress frame and guided by said guideways.

13. A combined bed and seat having a main frame having guideways, a reversible frame pivoted to said main frame, and a movable mattress frame guided by said guideways and supported by said reversible frames in its reversed position and wholly disconnected therefrom in its collapsed position.

14. A combined bed and seat having a housing, a back, a movable seat, and a mattress frame in said housing comprising two pivotally connected unequal sections the shorter section extending within the housing rearwardly beneath the seat and the longer section extending upwardly therein behind the back, said sections being spaced from said seat and back respectively, a sufficient distance to support thereon suitable bedding, and means operable while the seat is at rest for guiding said sections into alinement with each other.

15. A combined bed and seat having a main frame, a seat frame pivoted thereto, a mattress frame consisting of two pivoted rigid sections, and means for horizontally guiding the pivoted portion of the mattress frame forwardly over the seat in the inverted position of the latter.

16. A combined bed and seat having a housing, a back pivoted thereto, a seat pivoted to the housing at the front edge, a two section mattress frame, a guide extending upwardly behind the back, a separate guide extending forwardly and upwardly beneath the seat, both of said guides being secured to the housing, the upper end of one section of said mattress frame being guided by said first-named guide, two spaced parts of the other section being guided by the second guide, and a third guide secured to the under side of the seat and arranged to aline with the second guide.

17. A combined bed and seat having a housing, a back, a movable seat and a mattress frame in said housing comprising two pivotally connected sections extending within the housing one beneath the seat and the other behind the back, said sections being spaced from said seat and back respectively a sufficient distance to support thereon suitable bedding and means operable while the seat is at rest for guiding said sections into alinement with each other.

18. In a davenport bed, in combination with a housing, a back, and an invertible and extensible seat, a mattress frame having sections, of which a section, which is the rear section when extended, extends, in the concealed position of the bed, in the rear portion of the housing upwardly from the space within the housing and below the plane of the seat, and another section extends forwardly therefrom beneath the seat to a point nearer to its front than to its rear edge, and is spaced from the seat to contain bedding therebetween, said other section, in its open position, extending above, and to a point in front of the front edge of, said inverted seat.

19. In a davenport bed, in combination with a housing, a back and an invertible and extensible seat having legs for supporting its front portion when inverted, a mattress frame having sections, of which a section, which is the rear section when extended, extends, in the concealed position of the bed, in the rear portion of the housing upwardly from the space within the housing and, below the plane of the seat, and another section extends forwardly therefrom beneath the seat to a point nearer to its front than to its rear edge, and is spaced from the seat to contain bedding therebetween, said other section, in its open position, extending above, and to a point in front of the front edge of, said legs and inverted seat.

20. In a davenport bed, in combination with a housing, a back, and an invertible and extensible seat, a mattress frame having sections, of which a section, which is the rear section when extended, extends, in the concealed position of the bed, in the rear portion of the housing upwardly from the space within the housing and below the plane of the seat, and another section extends forwardly therefrom beneath the seat to a point nearer to the front than to its rear edge, and is spaced from the seat to contain bedding therebetween, and means whereby, in extending the mattress for use, said other section is guided over the seat, and moves relatively thereto beyond its free edge.

21. In a davenport bed, in combination with a housing, a back, and an invertible and extensible seat having legs for supporting its front portion when inverted, the housing supporting its rear portion, a mattress frame having sections, of which a section, which is the rear section when extended, extends in the concealed position of the bed, in the rear portion of the housing upwardly from the space within the housing and below the plane of the seat, and another section extends forwardly therefrom beneath the seat to a point nearer to its front than to its rear edge, and is spaced from the seat to contain bedding therebetween, said other section, in its open position, extending above, and to a point in front of the front edge of, said legs and inverted seat.

22. A combined bed and seat having a back and an extensible seat and comprising a bodily movable mattress frame having foremost and rearmost wholly concealed rigid sections pivotally connected together, the foremost section extending forwardly beyond the front edge of the seat when extended, the rearmost section being behind the back and the foremost section being under the seat, said back being of sufficient height and said seat being of sufficient depth that a full length mattress frame in two rigid sections can thus be concealed, and a webbing secured at its ends to the outer ends of the mattress frame sections.

23. A combined bed and seat having a jointed bodily movable mattress frame in front and rear sections pivoted together, an extensible seat, and a back, webbing connected at its ends to the outer ends of the mattress frame sections, and means for guiding the rear section upwardly behind the space normally occupied by the back and the front section rearwardly and downwardly beneath the space normally occupied by the seat, the front section extending forwardly in front of said seat when extended.

24. In combination with a housing for a folding bed, a back, and an invertible seat, a mattress frame composed of a plurality of sections, of which, in the concealed position of the bed, a front section is stored beneath the seat in the front portion of the housing and a rear section in the rear portion of the housing and out of alinement with the first-named section, and means whereby, when extending the mattress frame for use, said front section is guided along the uppermost portion of the seat in its inverted position, and said rear section is moved into alinement with the front section.

JOSEPH D. BELL.

Witnesses:

FRANCIS M. WRIGHT,
G. M. BALL.